Patented May 22, 1923.

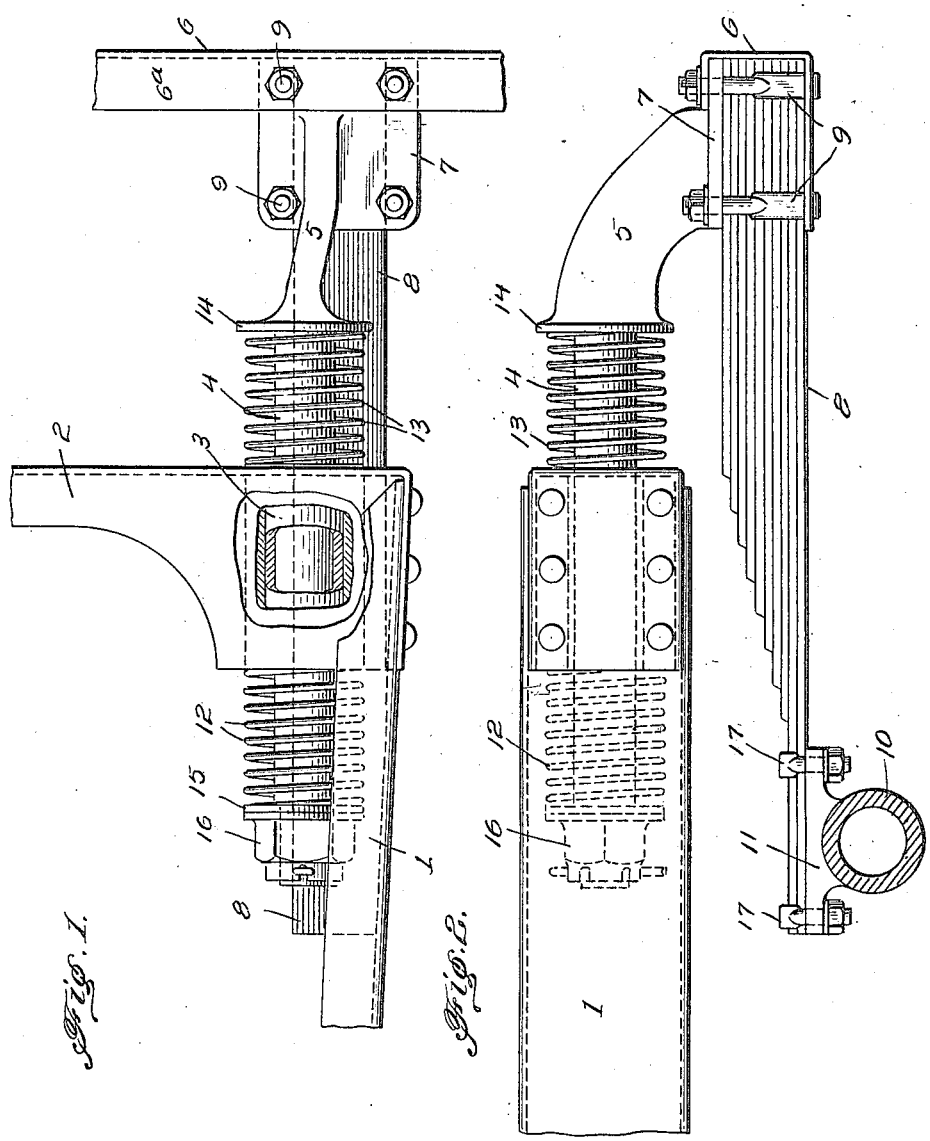

1,456,483

UNITED STATES PATENT OFFICE.

GEORGE H. DEIN, OF WOODHAVEN, NEW YORK.

SUSPENSION SPRING FOR AUTOMOBILES.

Application filed September 18, 1920. Serial No. 411,034.

*To all whom it may concern:*

Be it known that I, GEORGE H. DEIN, a citizen of the United States, residing at Woodhaven, in the county of Queens and State of New York, have invented certain new and useful Improvements in a Suspension Spring for Automobiles, of which the following is a specification.

This invention relates to suspension springs for automobiles.

The object of the invention is to provide springs of this character so constructed and arranged as to produce spring movement on the four corners of the vehicle frame or chassis, the motion being horizontal, vertical and in the arc of a circle; said springs also operating as front and rear bumpers preventing danger from collisions.

Another object is to provide a spring of this character which provides for a torque-like movement of the wheels relatively to the body to adapt the vehicle to pass over rough and uneven roads without discomfort to the riders.

With these and other objects in view, the invention consists in certain novel features of construction as hereinafter shown and described, and then specifically pointed out in the claims, and in the drawings illustrative of the preferred embodiment of the invention.

In the accompanying drawing:

Figure 1 represents a plan view of one corner of a vehicle chassis showing this improved spring applied, parts being broken out and in section, and, Fig. 2 is a side elevation thereof.

In the embodiment illustrated one corner of a vehicle chassis is shown comprising the usual side members as 1 and end members as 2 rigidly connected in the usual manner and composed of the ordinary angle irons which are commonly used in structures of this character.

The end bar 2 which is U-shaped in cross section with the upper portion thereof facing inward has an aperture in the rear wall thereof with a bushing 3 arranged between the flanges and which is designed to receive a stub shaft 4 which passes through this bar projecting in front and in rear thereof. This shaft 4 is carried by and preferably made integral with a downwardly offset arm 5 which is secured to a cross bar 6 as is shown clearly in Figs. 1 and 2. The arm 5 is fixedly connected to an attaching plate 7 preferably made integral therewith, said plate being arranged under the upper flange 6ª of the cross bar 6 which latter is also of U-shape in cross section and positioned sidewise with the flanges thereof extending toward the chassis of the vehicle. This plate 7 which is positioned directly under the upper flange 6ª of the cross bar 6 also rests on and is secured to a plurality of superposed leaf springs 8 being connected therewith by shackle bolts 9.

The other end of these leaf springs 8 is secured to an axle 10 which is equipped with a casting 11 forming attaching means for the springs which are secured thereto by inverted U-shaped shackle bolts 17 (see Fig. 2).

Coiled around the shaft 4 on opposite sides of the end bar 2 are coiled springs 12 and 13, the spring 12 being arranged between the inner end of bushing 3 and a washer 15 on shaft 4 held in position by a nut 16 which is secured against turning by a cotter pin or other suitable means. The spring 13 is arranged between the outer face or rear wall of bar 2 and a laterally extending flange or shoulder 14 formed at the junction of shaft 4 with the arm 5. These springs 12 and 13 operate as shock absorbers and the peculiar arrangement above described permits the spring 8 to move in an arc of a circle as well as horizontally and vertically.

It is to be understood of course that one of these suspension springs is mounted at each corner of the vehicle chassis and that two of the cross bars 6 are employed one at the front and one at the rear of the vehicle thereby adapting them to operate as front and rear bumpers to protect the car in case of collision. The peculiar spring motion obtained by the structure above described adapts the car equipped therewith to ride easily without permitting the occupants to feel the jars which usually occur incident to rough roads.

The preferred embodiment of the invention is disclosed in the drawings and set forth in the specification, but it will be understood that any modifications within the scope of the claims may be made in the construction without departing from the principle of the invention or sacrificing any of its advantages.

What is claimed is:

1. The combination with a vehicle frame including side and end bars; of spring supporting means therefor comprising front and rear cross bars, leaf springs secured at one end to said cross bars and arranged parallel with the side bars of said frame, axles attached to said springs, stub shafts carried by said cross bars and extended through said end bars of the frame, bushings carried by said end bars in which said stub shafts are mounted, coiled springs mounted on said shafts on opposite sides of said end bars, and means carried by said shafts for holding said springs in operative position.

2. The combination with a vehicle frame including side and end bars; of spring supporting means therefor comprising front and rear cross bars, leaf springs carried by said cross bars and arranged parallel with the side bars of said frame, axles attached to said springs, stub shafts carried by said cross bars and extended through said end bars of the frame, coiled springs mounted on each of said shafts on opposite sides of said end bars, and means carried by said shafts for holding said springs in operative position.

3. The combination with a vehicle frame including side and end bars rigidly connected; suspension springs mounted at the corners of said frame and each comprising a unit composed of a plurality of superposed leaf springs, a plate secured to one end of the leaf springs and an axle at the other end, an arm projecting upwardly from said plate and extending horizontally in a plane parallel with said springs, a stub shaft forming a longitudinal extension of said arm adapted to be passed through one corner of said frame, and coiled springs mounted on said shaft on opposite sides of the frame member through which it passes.

In testimony whereof, I affix my signature hereto.

GEORGE H. DEIN.